March 29, 1960     S. G. OPPENHEIM     2,930,235
GAUGING DEVICE
Filed Jan. 4, 1955     2 Sheets-Sheet 2
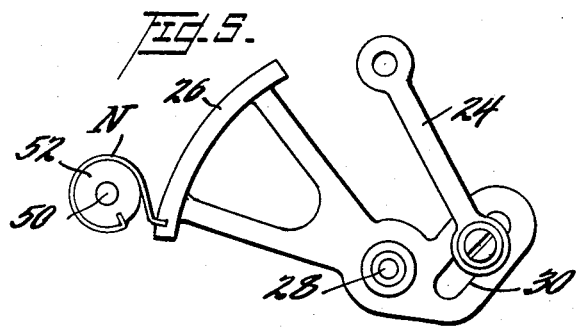
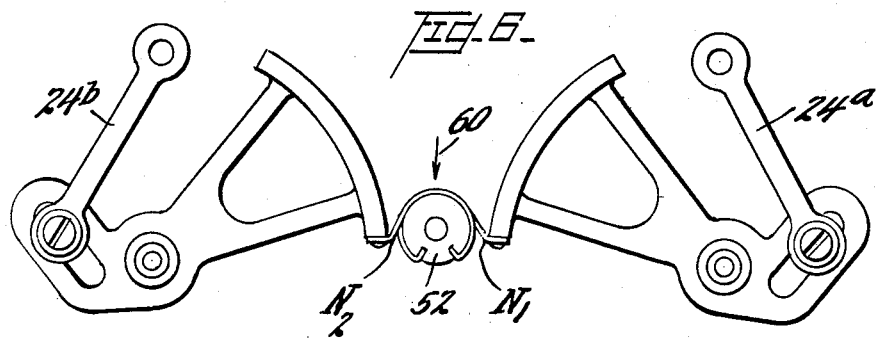
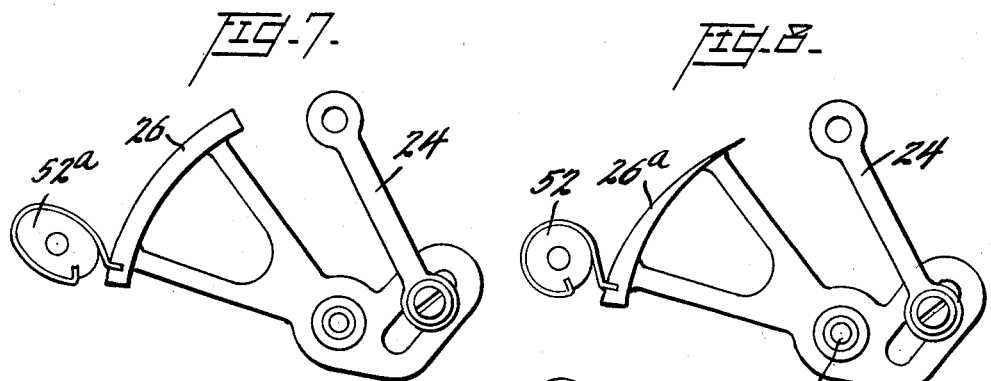
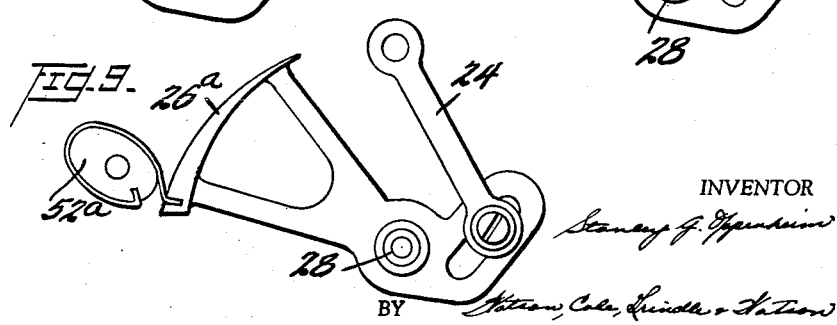
INVENTOR
Stanley G. Oppenheim
BY
ATTORNEYS

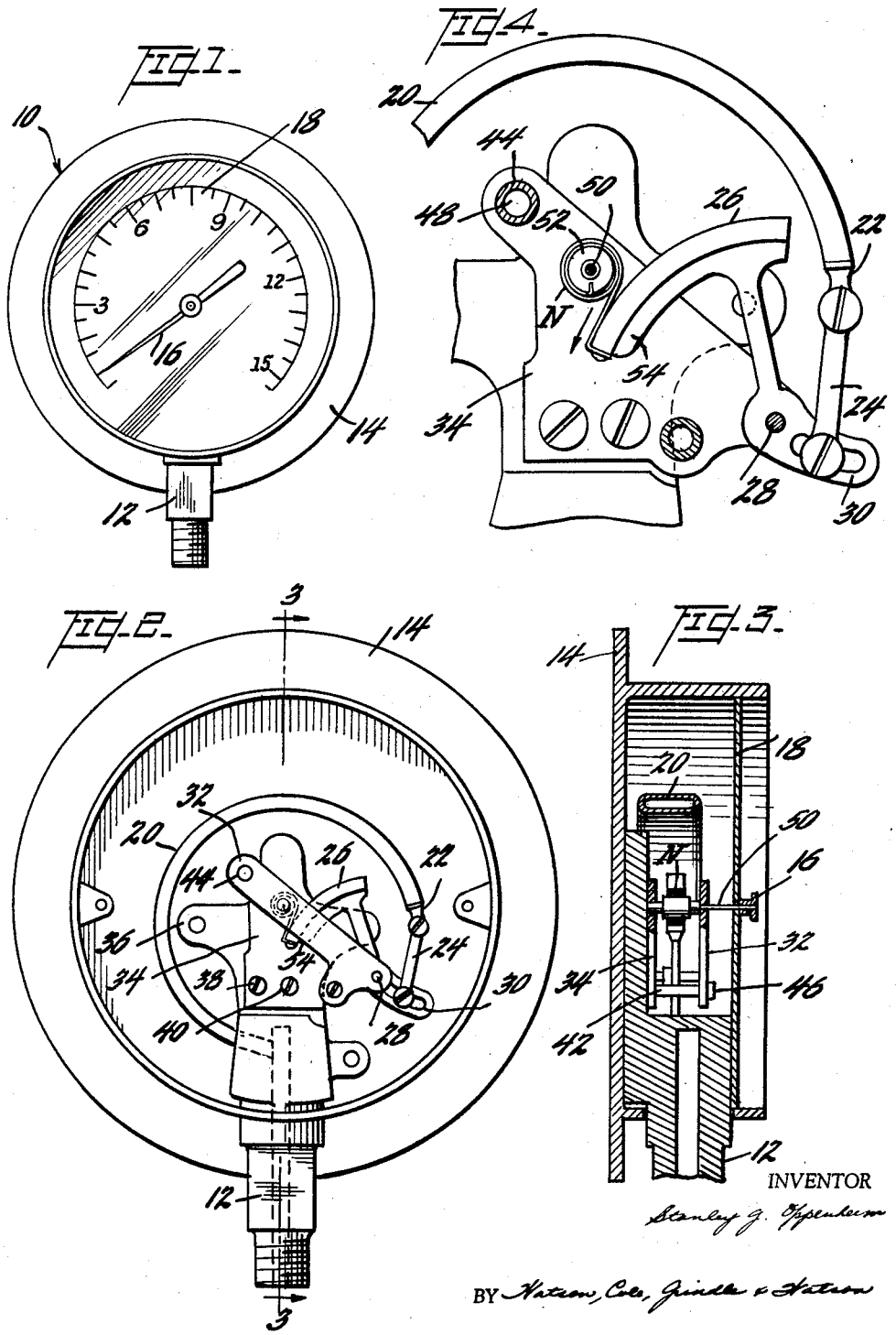

United States Patent Office 2,930,235
Patented Mar. 29, 1960

2,930,235

GAUGING DEVICE

Stanley George Oppenheim, Philadelphia, Pa.

Application January 4, 1955, Serial No. 479,841

10 Claims. (Cl. 73—411)

This invention relates to an improvement in indicating, recording, and controlling devices, but more particularly to an improved method and means of transmitting a displacement developed by an element or arrangement of elements which moves in response to changes in the status or condition to be measured.

The improvement provided by this invention may be employed in all types of gauging, measuring, recording, and controlling instruments in which one or more elements are arranged to move in response to changes in the condition or status being observed, and in which this movemet is employed to produce a related movement in a pointer, a stylus, a disk, a tape, a drum, or a sensing or actuating element in an electrical circuit. For the purpose of simplifying the explanation of the invention, it is described herein in connection with a gauge designed to indicate pressure changes within an enclosed system.

In gauges of the general type illustrated in the accompanying drawings, there is generally provided a segment which is connected with a pressure responsive element such as a Bourdon tube. Movement of the Bourdon tube in response to a pressure change produces a movement of the segment which is caused to rotate a pointer relative to a fixed scale. The movement of the pointer and scale are calibrated so that the pressure change, or the pressure existing in the system in which the gauge is fixed, can be read directly from the scale. The driving connection between the segment and the pointer generally consists of a rack formed on the periphery of the segment which engages a pinion fixed to the pin which carries the pointer. As the Bourdon tube develops a relatively small force, when the pressure within it varies, the driving connection between the segment and the pinion is desirably as frictionless as possible. Consequently, the teeth of the rack must be formed so that they only loosely engage the teeth of the pointer pinion, as otherwise the intermeshing teeth would bind to the extent that the relatively small force developed by the movement of the end of the Bourdon tube would be taken up principally in overcoming the friction between the intermeshing teeth. Where the teeth of the rack and the pinion are cut for a loose engagement to avoid this difficulty, it is necessary to provide a spring means, generally fixed to the pointer pinion, which acts to hold one edge of the teeth of the pinion in engagement with the driving edges of the teeth of the rack, as otherwise movement of the segment would not produce simultaneous movement of the pointer, and the pointer would also be free to oscillate. This would increase the wear between the intermeshing teeth, and considerably shorten the useful life of the gauge mechanism. As it is, gauges of this type cannot be successfully used where rapid or violent pressure fluctations occur, as the intermeshing teeth are soon worn to the extent that the gauge is inoperable or inaccurate.

The purpose of one aspect of the present invention is to provide a means for transmitting the forces developed by a Bourdon tube in such gauging devices from the segment to the indicator which is of such nature that the cost and difficulty of manufacturing the gauge is reduced and, more importantly, the indicator is caused to respond accurately and immediately to the movements of the Bourdon tube. A further object of the present invention is to provide a means for transmitting the force developed by a condition responsive element to an indicating device, which is unaffected by wear even when used for long periods of time in a system in which rapid and violet changes of pressure occur. These objectives are accomplished by motion transmitting means which comprises a constant force, long deflection spring. No auxiliary spring means is required to insure simultaneous motion of the pointer, inasmuch as the constant force spring has inherent stability and is self-restoring.

A further object of the present invention is to provide means for transmitting the force developed by a condition responsive element to an indicator that is accurate, reliable, simple to construct, and which, by simple modifications permits different proportional movements between the condition responsive element and the indicator, and it permits by progressively changing the radius of the pinion or of the contour of the segment to effect desired proportional motion of the indicating, recording, controlling, or actuating means.

It will be understood that the objects of the invention stated above are not limited to gauges or indicating devices which include a Bourdon tube, but are enqually applicable where the responsive element is a thermocouple, a diaphragm, a bellows, or any other device which may be arranged to produce a movement, mechanically or electrically, either linearly or arcuately in response to changes in conditions such as pressure or temperature or dimensions.

According to the present invention, the means for transmitting the force developed by the condition responsive element in a gauge to the indicator assembly is a constant force, long deflection spring which is formed from a strip of flat spring material which has been given a curvature by continuous heavy forming so that in its relaxed or unstressed condition it is in the form of a tightly wound spiral. This element is fully described in the paper entitled, "The Theory and Design of Long-Deflection, Constant-Force Spring Elements," by F. A. Votta, in Transactions of the American Society of Mechanical Engineers, for May 1952.

The characteristic of this element of interest in the present invention is that only a constant force is required throughout to extend the outer end of the element from its unstressed condition, so that the element may be considered as a spring element having a zero gradient. This condition exists when the relaxed spiral is supported for free rotation when the force is applied to extend the outer end. The outer end is backbent around the sector, producing a constant torque. It has been found that this characteristic of the spring element makes it uniquely suitable for transmitting movement of a condition responsive element to an indicator, recording or controlling device, especially since the element may be arranged to alter the proportional movement between the condition responsive device and the indicator from a direct proportion to a logarithmic function, or vice versa, or other proportions of motion.

The details of the theory and design of the spring element are fully set forth in the paper identified above and need not be further described here.

The manner in which spring elements of this kind are employed in the present invention will be apparent from the following detailed description of the embodiments of the invention disclosed in the accompanying drawings.

In the drawings:

Figure 1 is a front elevational view of a pressure gauge embodying the present invention;

Figure 2 is an enlarged rear elevational view of the same gauge, with its back cover removed to show in elevation the gauge mechanism;

Figure 3 is a vertical section view on the line 3—3, Figure 2;

Figure 4 is an enlarged elevational view taken on the line 4—4 of Figure 3;

Figure 5 is a diagrammatic view of a segment and an index pointer pinion interconnected by a spring element according to the present invention; and Figure 6 is a diagrammatic view of two segments and an indicator pinion interconnected according to the present invention, so that the indicator pinion is rotated in proportion to the difference in force applied to the segments.

Figures 7, 8 and 9 are diagrammatic views of modifications whereby a non-linear response of the indicating element may be obtained when and as desired.

Figure 1 illustrates a conventional gauge 10, having the usual socket 12, case 14 and pointer 16, which is arranged to be rotated with respect to the graduated dial 18. Referring to Figure 2, it may be seen that a Bourdon tube 20 has its open end fixed in the socket 12 in the usual manner, and that the distal end 22 of the tube is connected by a link 24 to the segment 26 which is pivotally supported on the pin 28 and provided with an arm 30 to which the link 24 is connected. The function of the segment 26 is to multiply the displacement of the end of the Bourdon tube 22 when the pressure therein is varied. The pivot pin 28 for the segment 26 is journaled in the spaced-apart plates 32, 34 which in turn are fixed to an upstanding extension 36 of the socket 12 by means of screws 38, 40. The plates 32, 34 are held in their spaced relationship by the sleeves 42, 44 through which the rivets 46, 48 extend. The pointer 16 is supported on a shaft 50 which is also journaled in the plates 32, 34 and has fixed to it, intermediate the plates, a bushing 52. The pointer 16 is fixed to the outer end of this shaft, as may be seen best in Figure 3.

Referring to Figure 4, it may be seen that a constant force, long deflection spring N is fixed at one end of the bushing 52, and has its outer end fixed to the end 54 of the segment 26. The arrangement is such that when fluid under pressure is introduced into the Bourdon tube 20 the tube tends to straighten and through the medium of the link 24 causes the segment 26 to pivot about the pin 28, thus moving the end 54 of the segment in the direction of the arrow shown in Figure 4. As the spring is tightly wound about the bushing 52, to which it is fixed, movement of the segment causes an immediate movement of the pointer 16 that is carried on the shaft 50.

In the arrangement shown in Figure 4, it will be observed that the bushing 52 is relatively small and that there are several convolutions of the spring wound around the bushing, so that as the segment 54 moves in the direction of the arrow, the spring will unwind progressively about a diminishing radius. Accordingly, the indicator 16 will respond in a logarithmic relationship to movement of the segment. It will be observed also that the extent of the movement of the pointer can be varied by enlarging or diminishing the diameter of the bushing 52.

The type of driving connection described above obviates many of the difficulties that are inherent in previous arrangements wherein a toothed drive is provided between the segment and the pinion on the pointer shaft. In the first place, the driving connection provided by this invention removes the need for the expensive tooth forming operation and also for the spring required to hold the loosely fitting teeth in constant driving engagement. Furthermore, the driving connection provided by this invention is relatively frictionless, and is such that movement of the segment produces an instantaneous and proportional movement of the pointer. A further advantage of the subject construction is that it is not subject to wear or breakage even though the gauge may be connected into a system in which rapid and violent fluctuations of pressure occur. This invention also makes it possible to easily alter the relationship of the response by the indicator to movements of the segment. This may be accomplished by merely enlarging the diameter of the bushing 52 or increasing the number of turns of spring on the bushing to thereby increase the radius about which the spring unwinds, and some of the modifications in this respect which are possible are described below in connection with Figures 5 and 6. The nature and extent of the response of the indicator to movements of the segment may also be varied by appropriate shaping of the working surface of the segment and pinion, as illustrated in Figures 7, 8 and 9.

Another advantage of the construction provided by this invention, in all its forms, is that a given deflection of the movable condition responsive element will produce the same movement of the pointer at any portion of the scale, as the spring has a substantially zero gradient.

Figure 5 indicates a modification of a connection between the condition responsive element and the bushing carried on the pointer shaft which provides a linear response by the pointer to movements of the segment. It will be observed that the spring is considerably shortened as compared to the one shown in the preceding figures, so that but a single convolution is wound about the bushing 52. Inasmuch as the spring unwinds from the bushing at a constant radius, the arrangement provides a linear response as compared to the logarithmic response obtained from the arrangement illustrated in Figure 4. The extent of the response to a given unit of movement of the segment may be easily varied by enlarging or diminishing the diameter of the bushing 52.

Referring to Figure 6, an arrangement is illustrated in which an indicator is made to respond according to the differences in the forces applied to the springs N–1 and N–2 by their associated distance multiplying segments or pulleys. The outer ends of both springs are fixed to the periphery of the bushing 53, so that the forces applied thereto are in opposition to one another. The bushing may be fixed to an indicator shaft, as illustrated in connection with Figures 1–4, or a scale may be inscribed on one or the other of the springs, and read with respect to a fixed index 60 on the casing within which the elements may be mounted.

The relationship of the response of the indicator element to movement of the segment may also be selectively varied by the means illustrated in Figures 7, 8 and 9. Figure 7 illustrates a pinion 52a which is non-circular in outline, and consequently, one in which the effective radius from which the constant force, long deflection spring unwinds is non-uniform. The exact relationship of the indicator to the segment movement may be predetermined by shaping the outline of the pinion 52a. The relationship of the response of the indicator to segment movement may be similarly varied by varying the effective radius of the segment surface onto which the spring unwinds, as shown in Figure 8. It will be observed that the radius of the working surface of the segment struck from the pivot pin 28 diminishes to the right, as viewed in Figure 8, and thus the spring is drawn off the pinion 52 onto a segment of constantly diminishing radius. The response of the indicator to segment movement is therefore non-linear, and the exact nature of the response may be determined by the contour provided for the working surface of the segment. It will be evident that the radius defining the location of the working surface of the segment may be increased, rather than decreased, to the right, and that an eccentric pinion may be combined with a segment of varying radius. One form of this combination is illustrated in Figure 9.

The present invention is not limited to measuring instruments in which the indicator is made to respond with rotary motion, as in the case of pointers, drums, discs, etc., but is equally applicable to devices such as dimensional air gauges in which the desired measurement is effected by linear displacement of the indicator of the device.

Having thus described the invention, what is claimed as new and is desired to be secured by Letters Patent is:

1. A gauge comprising sensing means movable in response to a condition to be gauged, an indicator means movable in one direction to represent a greater magnitude of the gauged condition and movable in another direction to represent a lesser magnitude thereof said indicator means including a rotatively mounted element, and a constant force, long deflection spring connected at one end to said movable sensing means and at its other end to said element, said spring having an initially curved form from which it is progressively unrolled by movement of said sensing means in one of said directions and to which it progressively rolls upon movement of said sensing means in the other of said directions, whereby said spring serves to drivingly connect said sensing means and indicator means to cause instantaneous and related movements thereof in either direction upon change of magnitude in the gauged condition.

2. A gauge as claimed in claim 1 in which said movable sensing means comprises a segment to which the said one end of said spring is connected, and the said indicator means comprises a rotatably supported bushing to which the other end of said spring is connected, said spring being coiled, at least partially, about said bushing in its rest position.

3. A gauge as claimed in claim 2 in which a plurality of convolutions of said spring are formed around said bushing.

4. A gauge as claimed in claim 2 wherein only a single convolution of said spring is formed around said bushing.

5. A gauge as claimed in claim 2 wherein said spring is drawn from around said bushing onto the surface of said segment, and in which said bushing is non-circular in outline.

6. A gauge as claimed in claim 3 wherein said surface of said segment is of a varying radius.

7. A gauge as claimed in claim 2 wherein said spring is drawn from around said bushing onto the surface of said segment, and in which said surface of said segment is of a varying radius.

8. A gauge as claimed in claim 1 wherein the said movable indicator means comprises a bushing to which the said one end of said spring is fixed and in which a plurality of convolutions of said spring are formed around said bushing.

9. A gauge comprising a sensing means movable in response to variations in a condition to be gauged, indicator means movable to represent the status of the condition, said indicator means including a rotatively mounted element, a zero gradient, constant force, long deflection spring operatively connected at one end of said sensing means and being operatively connected at its other end to said element, and in rest position, coiled at least partially on said element, whereby throughout the movement of said sensing means, a given force transmitted to said spring will cause an instantaneous and related movement of said indicator means and upon the removal of said force the said indicator means will be restored to its initial position by said spring.

10. A gauge comprising a sensing means movable in response to variations in a condition to be gauged, indicator means movable to represent the status of the condition, said indicator means including a rotatively mounted element, a zero-gradient, constant force, long deflection spring operatively connected at one end to said sensing means and being operatively connected at the other end to said element, whereby throughout the movement of said sensing means, a given force transmitted to said spring will cause an instantaneous and related movement of said indicator means and upon removal of said force the said indicator means will be restored to its initial position by said spring, and said sensing means comprising a Bourdon tube having its movable end connected to a pivotedly supported segment, said one end of said spring being attached to said segment.

References Cited in the file of this patent

UNITED STATES PATENTS

| 35,871 | Dodge | July 15, 1862 |
| 2,208,817 | Rudolf | July 23, 1940 |
| 2,575,935 | Westerberg | Nov. 20, 1951 |
| 2,636,394 | Melchior | Apr. 28, 1953 |
| 2,694,315 | Swift et al. | Nov. 16, 1954 |
| 2,706,913 | Trossi | Apr. 20, 1955 |

FOREIGN PATENTS

| 355,358 | France | Aug. 26, 1905 |
| 232,211 | Switzerland | Aug. 1, 1944 |

OTHER REFERENCES

Votta: "The Theory and Design of Long-Deflection Constant-Force Elements," 1952 Transactions of A.S.M.E., pp. 439–450.